(12) United States Patent
Achrekar

(10) Patent No.: US 10,319,536 B1
(45) Date of Patent: Jun. 11, 2019

(54) HIGH-CAPACITY ELECTRICAL ENERGY STORAGE DEVICE

(71) Applicant: Prakash Achrekar, Anaheim, CA (US)

(72) Inventor: Prakash Achrekar, Anaheim, CA (US)

( * ) Notice: Subject to any disclaimer, the term of this patent is extended or adjusted under 35 U.S.C. 154(b) by 377 days.

(21) Appl. No.: 14/082,141

(22) Filed: Nov. 16, 2013

Related U.S. Application Data

(60) Provisional application No. 61/796,719, filed on Nov. 19, 2012.

(51) Int. Cl.
*H02J 7/00* (2006.01)
*H01G 11/08* (2013.01)

(52) U.S. Cl.
CPC .................... *H01G 11/08* (2013.01)

(58) Field of Classification Search
USPC ............... 320/162, 164, 166, 167, 118, 120
See application file for complete search history.

(56) References Cited

U.S. PATENT DOCUMENTS

| | | | |
|---|---|---|---|
| 3,932,797 A * | 1/1976 | York | G01R 19/16542 320/136 |
| 6,628,572 B1 * | 9/2003 | Yabe | G04C 10/00 320/128 |
| 6,693,851 B1 * | 2/2004 | Fujisawa | G04C 10/00 320/121 |
| 7,541,782 B2 * | 6/2009 | Narendra | H01C 3/20 320/162 |
| 2005/0282067 A1 * | 12/2005 | Gutkin | H01G 9/038 429/122 |
| 2007/0262746 A1 * | 11/2007 | Kang | H01M 16/00 320/112 |
| 2008/0211457 A1 * | 9/2008 | Rudorff | H02J 7/0016 320/118 |
| 2010/0159356 A1 * | 6/2010 | Mahoney | C04B 35/482 429/495 |
| 2011/0210701 A1 * | 9/2011 | Nakamura | H01M 10/441 320/118 |
| 2012/0169270 A1 * | 7/2012 | Cho | H01M 10/441 320/101 |
| 2012/0328916 A1 * | 12/2012 | Enning | H01M 2/1077 429/72 |
| 2013/0044017 A1 * | 2/2013 | Matsuzawa | H03M 1/165 341/136 |

* cited by examiner

*Primary Examiner* — Brian Ngo
(74) *Attorney, Agent, or Firm* — Jeffrey C. Wilk

(57) ABSTRACT

A high-voltage energy storage device comprising at least one capacitor of any type, a main power source providing a high voltage to the electrodes of the capacitor either directly coupled or attached during charging of the high-capacity electrical energy storage device, and a secondary low-voltage power source providing an amplified high voltage to the electrodes of the capacitor that causes the stored electrical energy to be retained so long as the low-voltage power source remains active. A hybrid motor vehicle that includes a recoverable energy storage system, which recovers kinetic energy during operation of the hybrid motor vehicle, and a high-voltage energy storage device in accordance with the invention coupled to the recoverable energy storage system is also disclosed.

17 Claims, 4 Drawing Sheets

HIGH-CAPACITY ELECTRICAL ENERGY STORAGE DEVICE

RELATED APPLICATION(S)

This application claims priority of U.S. Provisional Patent Application Ser. No. 61/796,719, filed on Nov. 19, 2012, entitled "HIGH CAPACITY ELECTRICAL ENERGY STORAGE DEVICE," which application is incorporated in its entirety in this application by this reference.

BACKGROUND OF THE INVENTION

1. Field of the Invention

The invention is related generally to high-capacity electrical energy storage devices, and more particularly, to electrical energy storage devices comprising high surface area capacitors.

2. Related Art

A capacitor is a well-known electrical component that is capable of storing electrical energy. Generally, capacitors may be classified as conventional electrostatic capacitors, electrolytic capacitors, or electric double-layer capacitors. Because the electrical energy is stored physically, with no chemical or phase changes taking place as occurs in conventional low-voltage lead-acid batteries, the process is highly reversible and the discharge-charge cycle of a capacitor can be repeated over and over again, virtually without limit.

Capacitors are widely used in electronics for blocking direct current (DC) and passing alternating current (AC), and as signal filters, power sources, and the like. Generally, a capacitor comprises a pair of conductors that are separated by a dielectric region or material. Some capacitors may be "air" capacitors with no dielectric material. When a voltage is applied across the conductors, an electric field is generated in the dielectric that stores energy. Recently, capacitors have been utilized as a supplement to conventional batteries or as accumulators that act as an energy storage device.

To serve as an energy storage device, a capacitor ideally possesses a high capacitance (where the unit of capacitance is the farad (F)). Conventional electrostatic capacitors with a high specific capacity utilizing solid dielectrics are well known. For example, capacitors using barium titanate (BaTiO$_3$) have a large permittivity of the dielectric material on the order of $\varepsilon$>1000 and specific capacity of approximately 0.3 F/cm$^3$. Electrolytic capacitors have a higher capacitance per unit volume but with performance disadvantages such as reliability issues related to the electrolyte selected.

As for the electric double layer capacitor (also referred to as supercapacitors or ultracapacitors), these types of capacitors store an electrical charge in a double layer at the interface formed between a high-surface-area carbon electrode and an electrolytic solution electrolyte. The specific capacity of such capacitors is on the order of 2-46 F/cm$^3$ at the maximal specific energy (the amount of energy stored per unit of mass) up to 0.045 megajoules per kilogram (MJ/kg). Unfortunately, the electrolytic double layer principle utilized by these types of capacitors usually breaks down at voltages above approximately 5 volts. Such low voltage thus requires stacking many of these capacitors in series, which considerably reduces their total capacitance, thereby reducing their charge storage potential.

Thus, a primary disadvantage of all types of capacitors relative to conventional batteries is their low energy densities and low maximum voltages. Of course, combining banks of capacitors in series and in parallel can overcome these disadvantages, but then the resultant systems may be too bulky and heavy (i.e., less energy storage/unit volume or weight) making them impractical as replacements for batteries. Another disadvantage is the capacitor's high self-discharge or leakage, i.e., the capacitor cannot store energy for as long as a conventional battery. The newer class of supercapacitors charge and discharge rapidly and may have an equivalent series resistance (ESR) of less than 1 ohm, but a maximum voltage of 5.2V or less. They are available in much larger capacities, such as 300 F or greater. They may be used to supply the massive surge current required to get a large electric motor started or to store energy in hybrid motor vehicles generated under braking or when excess torque is produced by an internal combustion engine (ICE). However, because supercapacitors tend to have significantly higher self-discharge rates, they cannot store energy for as long as a conventional battery and thus they present some disadvantages when used in hybrid or electric vehicles as energy storage devices.

In view of the foregoing, there is an ongoing need for providing capacitors having a higher energy density and maximum voltage, as well as reduced self-discharge.

SUMMARY

To address the foregoing problems, in whole or in part, and/or other problems that may have been observed by persons skilled in the art, the present disclosure provides systems, apparatus, instruments, devices, methods, and/or processes, as described by way of example in implementations set forth below.

A high-capacity energy storage device (or system) including at least one capacitor is disclosed. The high-capacity energy storage device may also include a main power source, which may be either integral to the device or operate as a stand-alone charging station, that generates the electrical energy stored in the capacitor. Further, the high-capacity energy storage device may also include a secondary low voltage potential providing an amplified high voltage to the electrodes of the capacitor that causes the stored electrical energy to be retained so long as the low power secondary source remains active.

The high-capacity energy storage device may be an apparatus including a capacitor that includes an anode electrode (positive) and a cathode electrode (negative) and a dielectric material positioned between the anode electrode and the cathode electrode. The high-capacity energy storage device may also include a main power source that provides electrical energy to the capacitor, and a low-voltage auxiliary power source that applies a high voltage potential to the anode electrode and the cathode electrode of the capacitor, which can be charged by the main power source.

A high-capacity energy storage device in accordance with the invention may be utilized in a gasoline-electric hybrid motor vehicle. The hybrid motor vehicle may include an internal combustion engine (ICE) powered by fuel in a tank, an electric motor powered by a high-voltage battery pack, a controller for power and battery management, and a low-voltage conventional auxiliary battery. The hybrid motor vehicle may also include a recoverable energy storage system (RESS), which recovers kinetic energy during operation of the hybrid motor vehicle, e.g., during braking, and a capacitor in accordance with the invention, which stores the recovered energy for later use as determined by the user of the hybrid motor vehicle or by the controller.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figure(s). The components in the figures are not necessarily to scale, emphasis instead being placed upon illustrating the principles of the invention. In the figures, like reference numerals designate corresponding parts throughout the different views.

DETAILED DESCRIPTION

Figure 1:
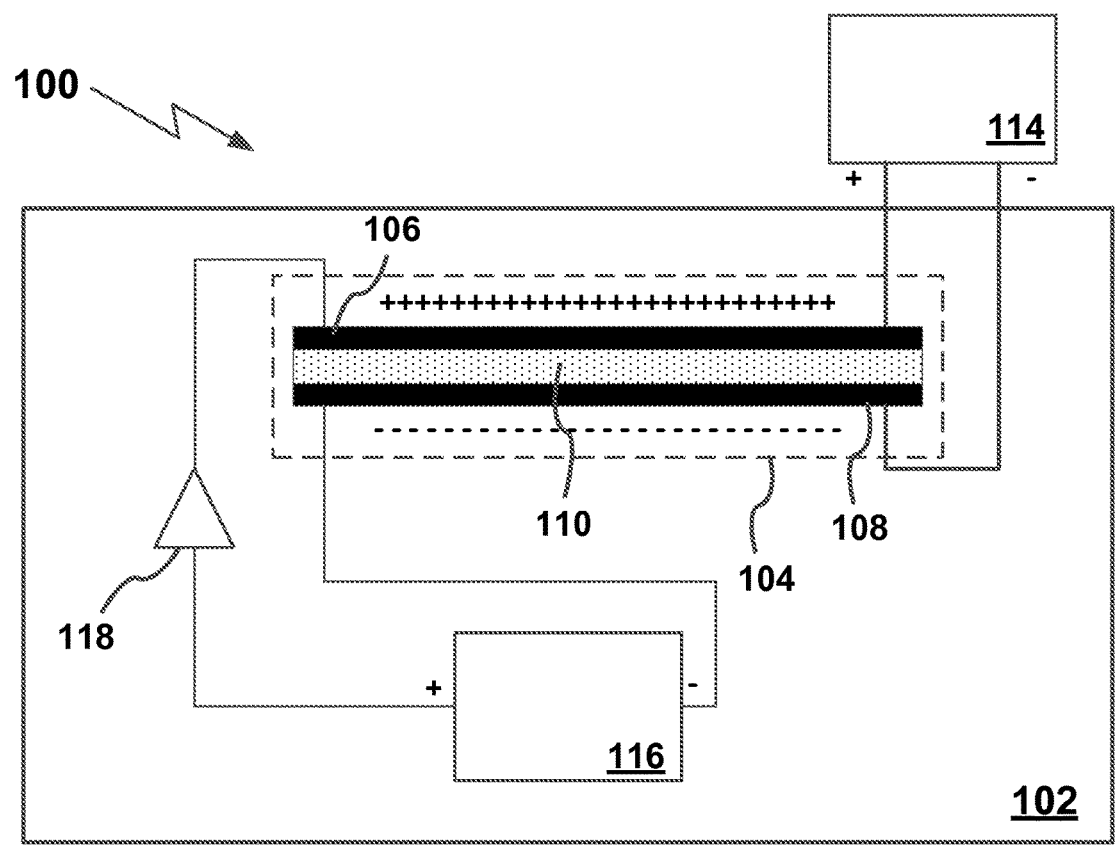
FIG. 1 shows a block diagram of an example of an implementation of a high-capacity electrical energy storage device in accordance with the invention having a single cell.

With reference to FIG. 1, a block diagram 100 of an implementation of a high-capacity electrical energy storage device ("HCESD") 102 is depicted. The HCESD 102 may include a capacitor 104 that includes an anode electrode (positively charged) 106, a cathode electrode (negatively charged) 108, with the anode electrode 106 and the cathode electrode 108 separated by a dielectric material 110. Coupled to the capacitor 104 may be a main power source 114. The main power source 114 supplies the energy to be stored in the capacitor 104, and may take various forms based on the implementation utilizing high-capacity electrical energy storage device 102. As an example, in a gasoline-electric hybrid motor vehicle, the main power source 114 may be a high-voltage battery pack containing multiple sealed Nickel Metal Hydride (NiMH) or lithium-ion battery modules, or any other type of battery modules, while in other implementations, such as a recoverable energy storage system (RESS), it may be a variable-voltage alternator that converts kinetic energy during deceleration of a motor vehicle that is stored in the capacitor 104.

In other implementations of the HCESD 102, the capacitor 104 may be replaced by a series/parallel bank that includes a plurality of electric double-layer capacitors, or a series/parallel bank that includes a plurality of electrolytic capacitors (see, e.g., FIGS. 2 and 3), with each cell of these capacitors including an anode electrode (positively charged), a cathode electrode (negatively charged), with the anode electrode and the cathode electrode separated by a dielectric material.

A fixating (or sacrificial) electrical voltage is applied to auxiliary power terminals (not shown) on the anode electrode 106 and the cathode electrode 108 by the low-voltage auxiliary power source 116 connected in parallel with the capacitor 104, with the fixating electrical charge being applied so long as the low voltage secondary power source 116 remains active. The low-voltage auxiliary power source may be a conventional 12V automotive battery. The application and removal of the fixating electrical voltage may be manually controlled by a user or automatically by a controller (not shown). The low-voltage auxiliary power source 116 may include an amplifier (not shown) that amplifies a lower voltage, e.g., 12 volts, to a higher operational voltage that matches the desired output voltage of the high-capacity electrical energy storage device 102. In this example, diode 118, or any other form of electronics that prevents any reverse current flow from the HCESD 102 into the low-voltage auxiliary power source 116, may be utilized to prevent damage to the auxiliary power source 116.

By applying the amplified sacrificial voltage to the capacitor 104, the high-capacity electrical energy storage device 102 will retain its stored electrical charge so long as this amplified sacrificial voltage remains applied, thus significantly extending the time during which the stored electrical charge will be maintained within the high-capacity electrical energy storage device 102 before self-discharging.

Figure 2:
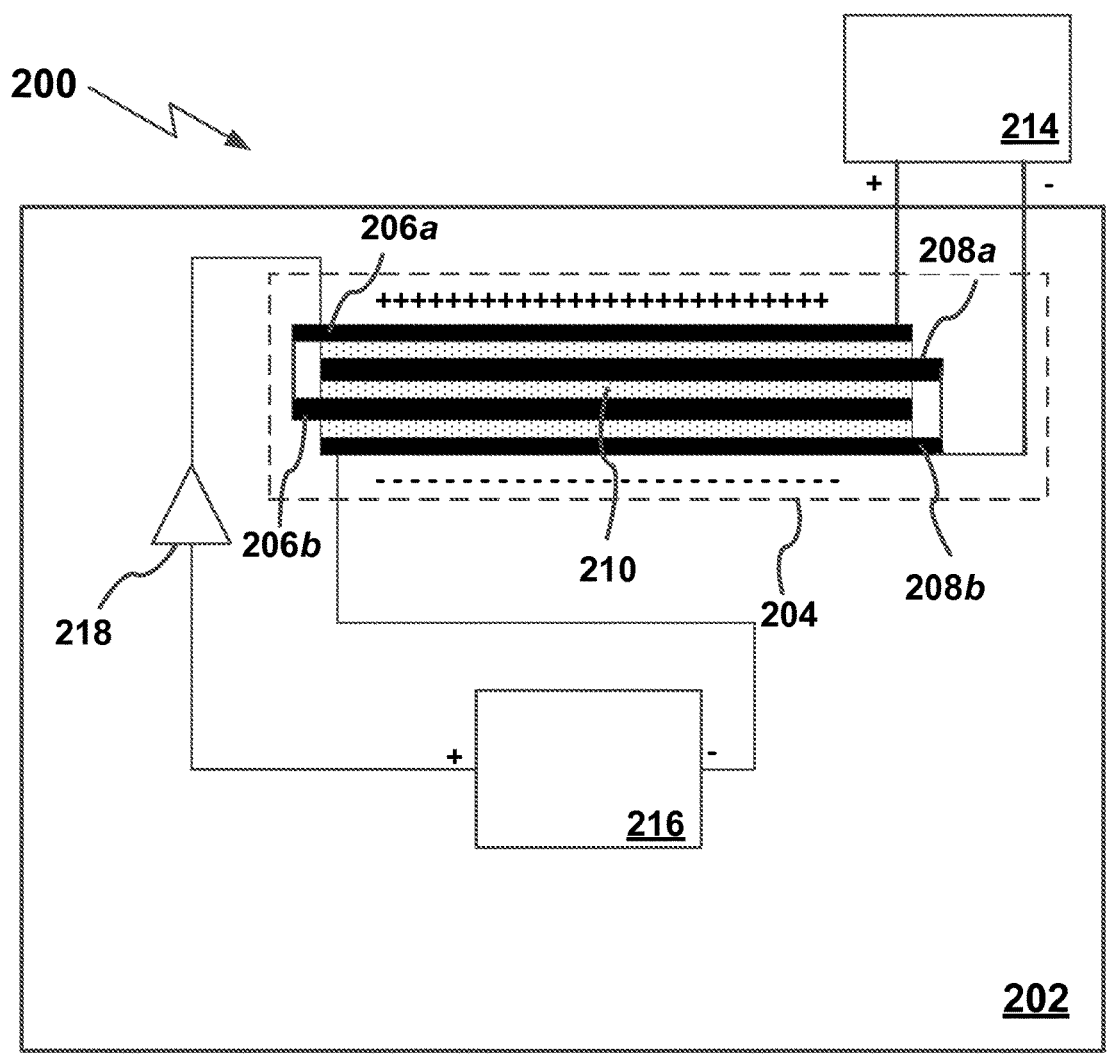
FIG. 2 shows a block diagram of an example of an implementation of a high-capacity electrical energy storage device in accordance with the invention having three cells.

Turning to FIG. 2, a block diagram 200 of another example of an implementation of a HCESD 202 is shown. The HCESD 202 may include a capacitor 204 that includes two pairs of anode electrodes (positively charged) 206a and 206b and cathode electrodes (negatively charged) 208a and 208b, forming three parallel cells. In this example, these three cells are formed by a dielectric material 210 formed within the anode electrodes 206a and 206b and the cathode electrodes 208a and 208b.

Coupled to the capacitor 204 may be a main power source 214. The main power source 214 supplies the energy to be stored in the capacitor 204, and may take various forms based on the type of implementation utilizing HCESD 202. As an example, in a gasoline-electric hybrid motor vehicle, the main power source 214 may be a high-voltage battery pack containing multiple sealed Nickel Metal Hydride (NiMH), or any other type of battery modules, while in other implementations, such as a recoverable energy storage system (RESS), it may be a variable-voltage alternator that converts kinetic energy during deceleration of a motor vehicle that is stored in the capacitor 204. A fixating (or sacrificial) electrical voltage is applied to auxiliary power terminals (not shown) on the anode electrodes 106a and 206b and the cathode electrodes 208a and 208b by the low-voltage auxiliary power source 116 connected in parallel with the capacitor 204, with the fixating electrical charge being applied so long as the low-voltage auxiliary power source 216 remains active. In this example, diode 218, or any other form of electronics that prevents any reverse current flow from the HCESD 202 into the low-voltage auxiliary power source 216, may be utilized to prevent damage to the auxiliary power source 216.

Figure 3:
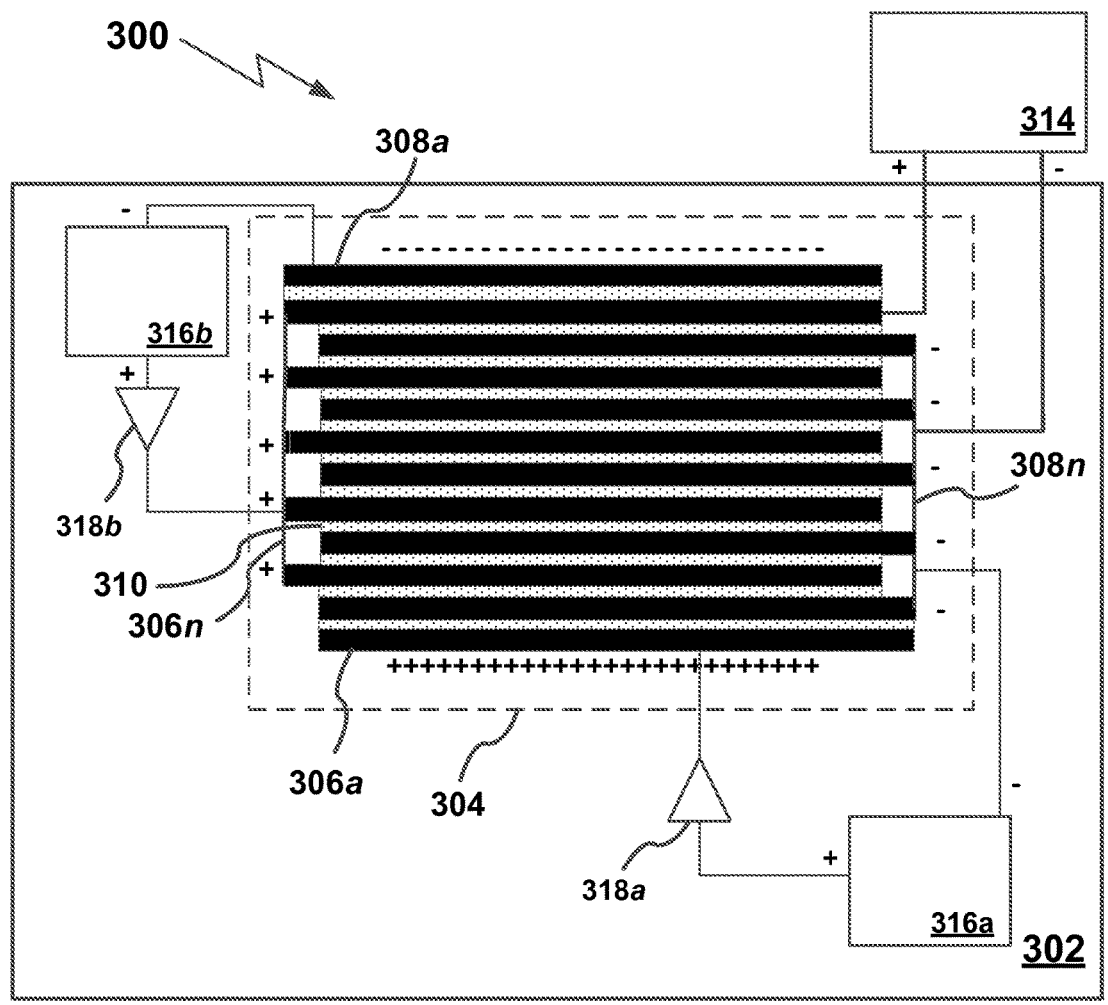
FIG. 3 shows a block diagram of an example of an implementation of a high-capacity electrical energy storage device in accordance with the invention having n-numbered cells.

FIG. 3 shows a block diagram 300 of another example of an implementation of a HCESD 302 having multiple cells. The HCESD 302 includes a capacitor 304 that includes multiple pairs of anode electrodes (positively charged) 306a-306n and cathode electrodes (negatively charged) 308a-308n, which in this example produces nine parallel cells formed by a dielectric material 310 formed within each pair of anode electrodes 306a and 306n—cathode electrodes 308a-308n. It will be understood and appreciated by those skilled in the art that n pairs of cathode electrodes and cathode electrodes may be utilized in other implementations, where the number n may vary as required by the desired voltage and power of high-capacity electrical energy storage device 302.

Coupled to the capacitor 304 may be a main power source 314. The main power source 314 supplies the energy to be stored in the capacitor 304, and may take various forms based on the type of implementation utilizing HCESD 302 as noted earlier. A fixating (or sacrificial) electrical charge voltage is applied to power terminals on the anode electrode 306*a* and cathode electrodes 308*n* by the low-voltage auxiliary power source 316*a* and on the anode electrode 306*n* and cathode electrode 308*a* by the low-voltage auxiliary power source 316*b*, connected in parallel with the high-capacity electrical energy storage device 302, with the fixating electrical charge being applied so long as the low-voltage auxiliary power source 316 remains active.

The low-voltage auxiliary power source may be a conventional 12V automotive battery. The application and removal of the fixating electrical voltage may be manually controlled by a user or automatically by a controller (not shown). The low-voltage auxiliary power sources 316*a* and 316*b* may each include an amplifier (not shown) that amplifies a lower voltage, e.g., 12 volts, to a higher operational voltage that matches the desired output voltage of the high-capacity electrical energy storage device 302. In this example, diodes 118*a* and 118*b*, or any other form of electronics that prevents any reverse current flow from the HCESD 302 into the low-voltage auxiliary power sources, may be utilized to prevent damage to the secondary power sources 316*a* and 316*b*, respectively.

Figure 4:
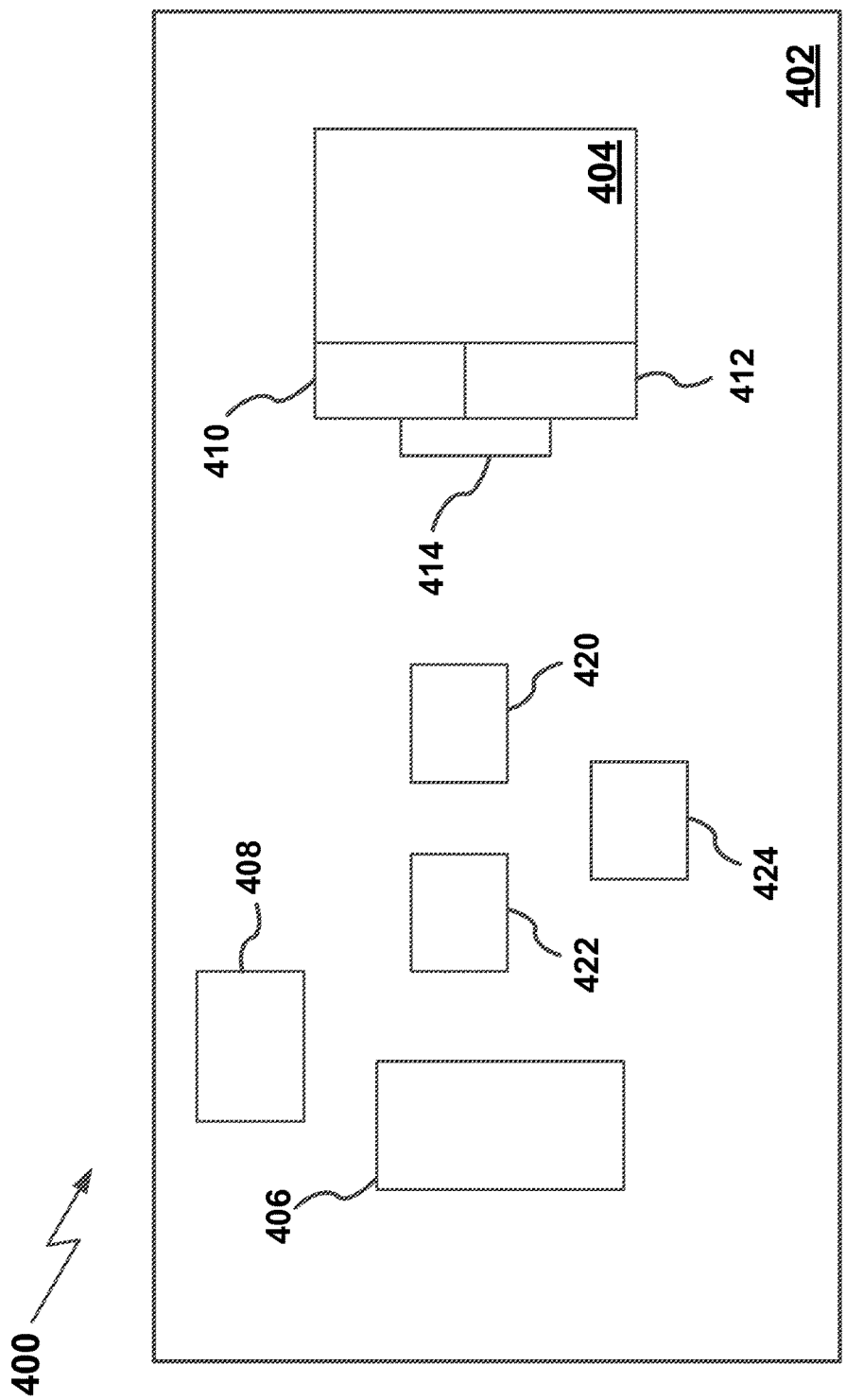
FIG. 4 shows a block diagram of an implementation of a gasoline-electric hybrid motor vehicle having an internal combustion engine (ICE), a high-voltage hybrid vehicle (HV) battery pack, an auxiliary battery, and a high-capacity electrical energy storage device in accordance with the invention.

FIG. 4 shows a high-level block diagram 400 of a gasoline-electric hybrid motor vehicle 402 that utilizes a HCESD 420 in accordance with the invention. The gasoline-electric hybrid motor vehicle 402 typically includes an internal combustion engine (ICE) 404, a high-voltage hybrid vehicle (HV) battery pack 406, a low-voltage conventional lead-acid battery 408, an electric motor 410, an electric generator 412, and an inverter 414. In operation, power cables (not shown) carry high-voltage direct current (DC) from HV battery pack 406 to inverter 414, where the DC voltage is converted to alternating current (AC) to drive electric motor 410. Electric motor 410 may be contained in a transaxle (not shown) of gasoline-electric hybrid motor vehicle 402 in order to power this vehicle. Also, inverter 414 may be configured to convert AC from electric motor 410 to DC to recharge HV battery pack 406.

Gasoline-electric hybrid motor vehicle 402 may also include HCESD 420, in accordance with the invention, and a secondary power source 422 that supplies a fixating electrical charge to power terminals of HCSED to retain its charge. In another example of an implementation, the secondary power source 422 may be supplied power from the low-voltage conventional lead-acid battery 408. Where the DC voltage is converted to alternating current (AC) to drive electric motor 410. Electric motor 410 may be contained in a transaxle (not shown) of gasoline-electric hybrid motor vehicle 402 in order to power this vehicle. Also, inverter 414 may be configured to convert AC from electric motor 410 to DC to recharge HV battery pack 406.

Electrical energy may be supplied by the HCESD 420 replacing HV battery pack 406. Alternatively, the electrical energy stored by HCESD 420 may be used in tandem with the HV battery pack 406. Recovered braking energy captured by recoverable energy storage system (RESS) 424, which may be, as an example, a variable-voltage alternator that converts kinetic energy to electric power that in turn may be stored in a high-capacity electrical energy storage device 420.

In the gasoline-electric hybrid motor vehicle 402, use of the HCESD 420 may have several advantages. First, in many regenerative energy capture systems, the charging current produced during braking/coasting may be too large for a conventional battery to accept but can be accepted by a high-capacity electrical energy storage device. Second, stop-start systems are being utilized in hybrid vehicles to reduce fuel consumption and vehicle emissions, and the rapid and repeated starting and stopping of the vehicle cannot be provided by conventional batteries as well as it can be by supercapacitors because of the latter's significantly faster charge and discharge times. Additionally, a high-capacity electrical energy storage device, in accordance with the invention, is able to retain its charge over an extended period of time, thus providing better engine starting and sustaining capabilities.

In general, the high-capacity electrical energy storage devices shown in FIGS. 1-4 may be used as replacements for conventional batteries, including Nickel Metal Hydride (NiMH) and lithium-ion battery modules, and accumulators, or as supplements thereto. For example, the high-capacity electrical energy storage devices may be used in all manner of motor vehicles, such as electrical or hybrid automobiles, hybrid or electrical mass transport vehicles, as well as smaller motor vehicles, such as golf carts and lawn mowers. In the case of the replacement of NiMH and lithium-ion battery modules, this is beneficial because the use of hazardous, non-biodegradable materials is accordingly reduced. The high-capacity electrical energy storage devices may also be used in portable devices, such as computers and other hand-held devices. In essence, one skilled in the art will recognize that the high-capacity electrical energy storage device in one form or another may be utilized to replace conventional battery packs however they may be used.

As for the high-capacity electrical energy storage device itself, its design may vary with differing applications. For example, the high-capacity electrical energy storage device can be tailored by varying the surface area of electrodes, the type of dielectric material, and the thickness of the dielectric, material of construction, etc. Furthermore, because the various implementations are not limited by the electrolyte dissociation inherent in conventional capacitors, these implementations can be charged at significantly higher voltages based on the thickness and type of the dielectric used. Voltage for storing an electrical charge using these techniques can be over a range from 1-1,000,000 volts and store considerable energy as required by the applicable operation.

A plethora of materials could be used for making the device. Such materials may include, for example, copper, nickel, stainless steels, carbon, silver, gold, conductive ceramics, nanostructured materials, etc. The high-capacity electrical storage device, as well as its capacitors, may also employ different shapes, such as cubes, ellipses, conductive wire mesh, sponge, cylinders, uneven fragments of crushed conductive media, spikes, etc.

In each implementation, the thickness of the dielectric layer may be relatively uniform without any pores and relatively thin. A variety of dielectric materials are readily available, such as ceramics, glass, plastics, and oxides of several metals that can be used for the intended application. The thickness of the dielectric layer may be between 0.0001 mm to several centimeters, depending on the application, the desired voltage and power, storage capacity, ease of fabrication, etc. The thickness of the dielectric coating may vary based on a number of factors. For example, a thinner dielectric coating allows for a higher charge storage capacity, but a lower breakdown voltage. In some embodiments, the dielectric coating may be sintered in situ.

An estimate of the storage capacity of an example of an implementation of a high-capacity electrical energy storage device, in accordance with the invention, may be calculated as follows. In this example, each cell of the high-capacity electrical energy storage device shown in FIG. 1 may have dimensions 1 m×1 m×0.007 m, including four copper sheets of 0.1 mm thickness, two per each electrode with a 4 mm carbon coating of 1 micron particles, and 0.1 mm of dielectric between the two electrodes. An additional 0.5 mm may be allowed for warpage and assembly considerations. Thus, the total thickness of each cell in this example may be approximately 7.0 mm.

Other parameters of this example may be: The number of electrodes per cell=2 (1 positive and 1 negative); The thickness of the dielectric $BaTiO_3$=0.05 cm between opposing electrodes, with permittivity $\varepsilon$=8.854×10$^{-12}$; A dielectric constant of $BaTiO_3$=1200; A charging voltage=500 volts for operating a 500 volt motor; and A surface area of copper electrodes=1 m×1 m=1 m$^2$.

As for the electrodes in supercapacitors, these may be made out of extremely porous, "spongy" material such as activated carbons, aerogels, xerogels, and nanostructures having an extremely high specific surface area. Thus the amount of electrical charge accumulated by pure electrostatic forces typical for high-capacity electrical energy storage devices depends on the surface area of the electrode/electrolyte interface, the relative permittivity of the solution g, and the reciprocal of the thickness d of the double layer.

As an example, using activated carbon, the surface area of each 0.1 micron carbon sphere=$\pi d^2$=3.1417×0.0000001$^2$=3.1417×10$^{-14}$ m$^2$. There are approximately 10 million layers of carbon particles of 0.0000001 m in the 0.4 cm thickness of the 1 m$^2$ square electrode. Each layer 1 m×1 m may have 1×10$^{12}$ particles of 0.000001 m diameter, assuming excellent distribution. Thus, the surface area of the carbon spheres=4000×1×10$^{12}$×3.1417×10$^{-12}$=3.142×10$^6$ m$^2$.

Therefore, in this example, the total surface area=sphere surface area+plate surface area. Total surface area=3.142×10$^6$ m$^2$ (neglecting plate area).

Capacitance=K×$\varepsilon$×(Surface Area/Thickness of dielectric);
=8.854×10$^{-12}$×1200×(3.142×10$^6$/0.0001); and
=3338 Farads=3338 Coulombs at one volt (where 1 Farad=1 Coulomb).

1 Coulomb=0.00027778 Ampere-hours. Therefore, 3338 Coulombs=0.927 ampere-hours (Ah). At 500 volts, this capacitance can be converted to an energy of 500V×0.927 Ah=463.6 watt-hours (Wh). Accordingly, the specific energy for the above-described high-capacity electrical energy storage device may be approximately 389.2 Wh/kg. Higher densities may be obtainable with improved designs and materials.

The foregoing description of implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

What is claimed is:

1. A high-capacity electrical capacitor ("HCEC"), the HCEC comprising:

at least one capacitor having a pair of high-voltage high-power primary terminals and a pair of high-voltage low-power auxiliary terminals;
a main power source coupled to the high-voltage high-power primary terminals of the HCEC, wherein the main power source supplies electrical energy to the at least one capacitor; and
an auxiliary power source coupled to the high-voltage low-power auxiliary terminals of the HCEC, wherein the auxiliary power source supplies a fixating electrical voltage to the at least one capacitor such that the at least one capacitor of the HCEC will retain any stored electrical energy so long as the fixating electrical voltage is supplied to the at least one capacitor of the HCEC.

2. The HCEC of claim 1, where the auxiliary power source includes an amplifier configured to provide a voltage equal to that supplied by the main power source.

3. The HCEC of claim 1, where the at least one capacitor comprises:
an anode electrode;
a cathode electrode; and
a dielectric material positioned between the anode electrode and the cathode electrode.

4. The HCEC of claim 1, where the main power source is a high-voltage battery pack containing multiple sealed battery modules.

5. The HCEC of claim 4, where the anode and cathode electrodes are manufactured from a material selected from a group consisting of activated carbon, carbon aerogel, xerogels, carbon nanotubes, carbon nano-fibers, nickel hydroxide [$Ni(OH)_2$] nano flakes, and any other conductive media that can be produced in the form of large surface area particles.

6. The HCEC of claim 5, where the dielectric material is a solid metal oxide layer.

7. The HCEC of claim 1, where the at least one capacitor includes a plurality of capacitors connected in parallel.

8. The HCEC of claim 1, where the at least one capacitor includes a plurality of capacitors connected in series.

9. A method of storing an electrical charge in a capacitor having a pair of high-voltage high-power primary terminals and a pair of high-voltage low-power auxiliary terminals, the method comprising:

providing an electrical high voltage to the high-voltage high-power primary terminals of the capacitor, thereby causing electrical energy to be stored in the capacitor; and
providing a fixating electrical voltage to the low voltage auxiliary terminals of the capacitor, whereby the fixating electrical voltage causes the capacitor to retain the electrical energy stored therein so long as the fixating electrical voltage is supplied to the capacitor.

10. The method of claim 9, where the step of providing the fixating electrical voltage includes amplifying the fixating electrical voltage to a voltage compatible with the electrical high voltage provided to the high-voltage low-power auxiliary terminals of the capacitor.

11. The method of claim 9, where the electrical high voltage provided to the primary terminals is provided by a high-voltage battery pack containing multiple sealed battery modules.

12. The method of claim 11, where the multiple sealed battery modules are Nickel Metal Hydride battery modules and lithium-ion battery modules.

13. The method of claim 9, where the step of providing a fixating electrical voltage further comprises controlling application and removal of the fixating electrical voltage automatically with a controller.

14. The method of claim 9, where the fixating electrical voltage is provided by a conventional lead-acid automotive battery.

15. The method of claim 9, where the electrical high voltage is provided by a variable-voltage alternator that converts kinetic energy during deceleration of a motor vehicle to electrical energy.

16. An apparatus for storing electrical energy, the apparatus comprising:
- at least one capacitor having high-voltage high-power primary terminals and high-voltage low-power auxiliary terminals;
- a main power source coupled to the high-voltage high-power primary terminals of the at least one capacitor, wherein the main power source supplies electrical energy to the at least one capacitor; and
- an auxiliary power source coupled to the high-voltage low-power auxiliary terminals of the at least one capacitor, wherein the auxiliary power source supplies a fixating electrical voltage to the at least one capacitor such that the at least one capacitor will retain any stored electrical energy so long as the fixating electrical voltage is supplied to the at least one capacitor.

17. The apparatus of claim 16, wherein the fixating electrical voltage is provided by a low voltage conventional lead-acid battery.

* * * * *